W. E. VER PLANCK.
INTERNAL COMBUSTION ENGINE.
APPLICATION FILED AUG. 2, 1916.

1,245,644.

Patented Nov. 6, 1917.
4 SHEETS—SHEET 2.

Inventor:
William E. Ver Planck,
by Albert G. Davis
His Attorney.

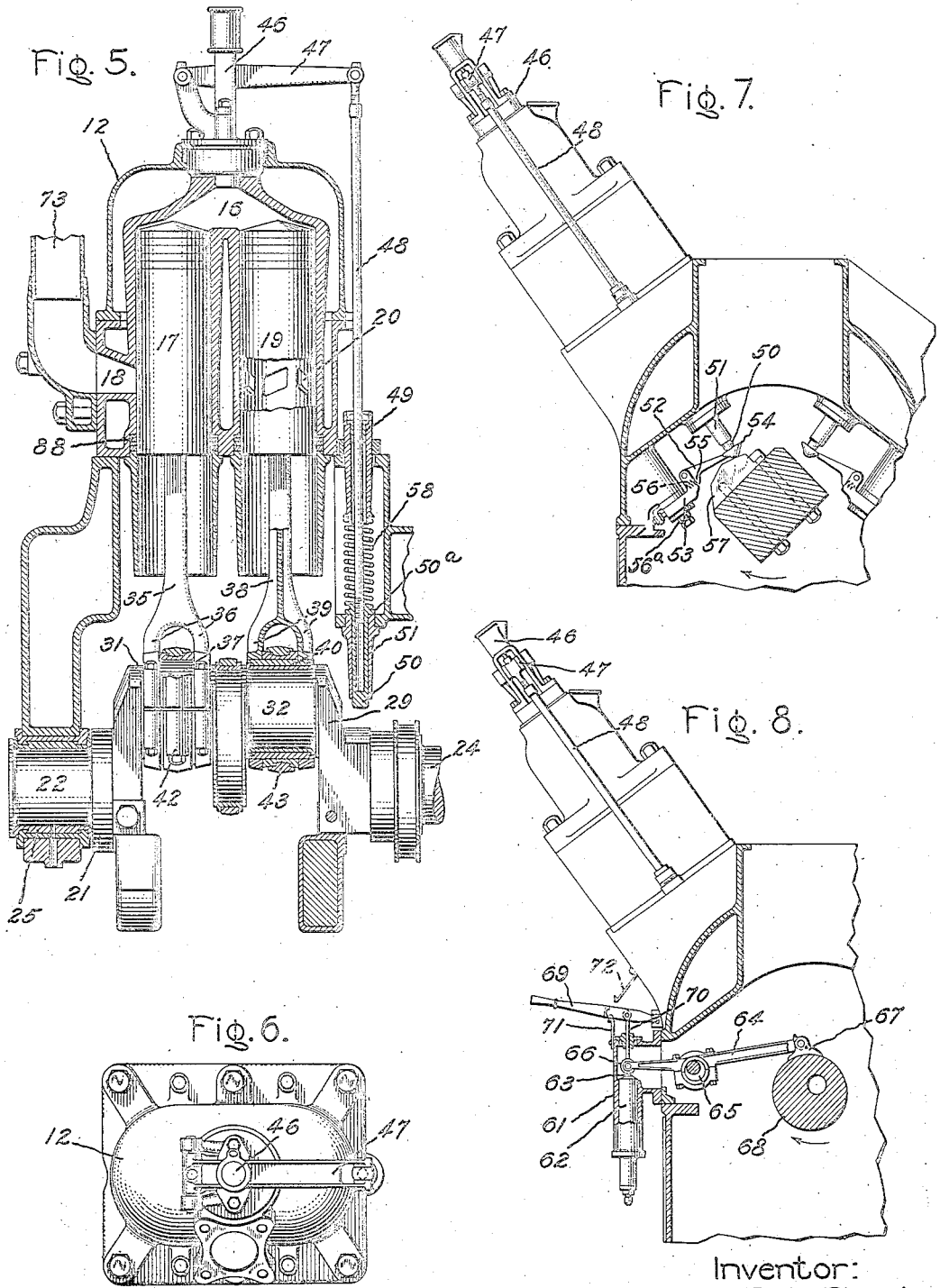

UNITED STATES PATENT OFFICE.

WILLIAM EVERETT VER PLANCK, OF ERIE, PENNSYLVANIA, ASSIGNOR TO GENERAL ELECTRIC COMPANY, A CORPORATION OF NEW YORK.

INTERNAL-COMBUSTION ENGINE.

1,245,644. Specification of Letters Patent. Patented Nov. 6, 1917.

Application filed August 2, 1916. Serial No. 112,845.

*To all whom it may concern:*

Be it known that I, WILLIAM E. VER PLANCK, a citizen of the United States, residing at Erie, in the county of Erie, State of Pennsylvania, have invented certain new and useful Improvements in Internal-Combustion Engines, of which the following is a specification.

The present invention relates to two-cycle internal combustion engines of the high compression type, that is, of the type in which, on the compression stroke, pure air is first compressed to a pressure such that its temperature is above that of the igniting point of the fuel after which the charge of fuel is injected by a blast of air. With such engines it is customary to provide a scavenger pump driven from the crank shaft for supplying scavenging air and a compressor also driven from the crank shaft for supplying blast air for injecting the fuel and air for starting the engine.

The object of the present invention is to provide an improved arrangement of parts in an engine of this type whereby the engine will be compact so as to occupy a minimum amount of space, and at the same time the parts will be readily accessible for inspection and repair. The engine is more particularly intended for use on a self-propelled vehicle, as a gas electric car, of the type wherein the engine drives an electric generator which in turn supplies electric current to motors located on the car axles. In such installations the available cab space is limited and it is necessary to conserve such space as much as possible.

For a consideration of what I believe to be novel and my invention, attention is directed to the accompanying specification and the claims appended thereto.

Figure 1:
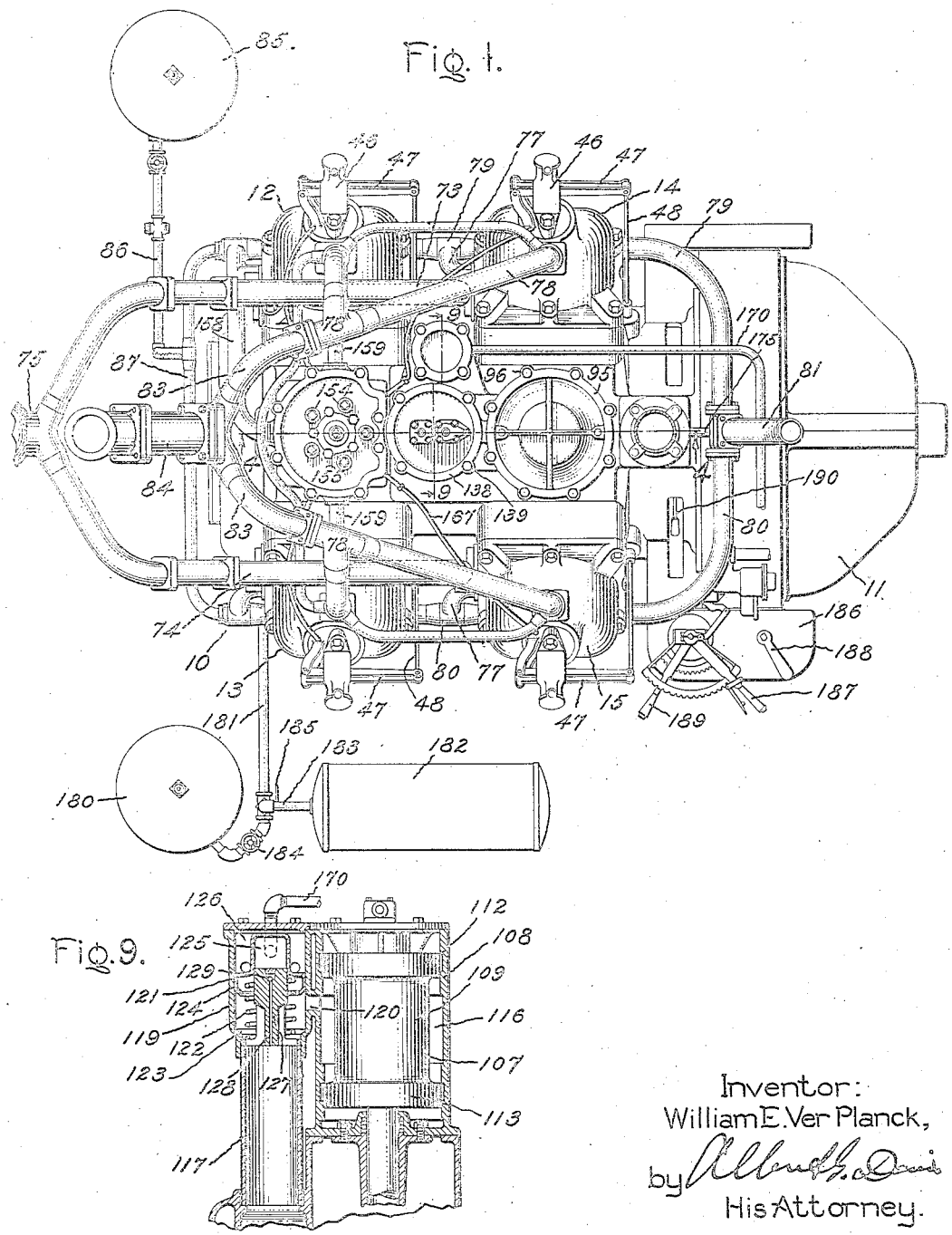
Figure 2:
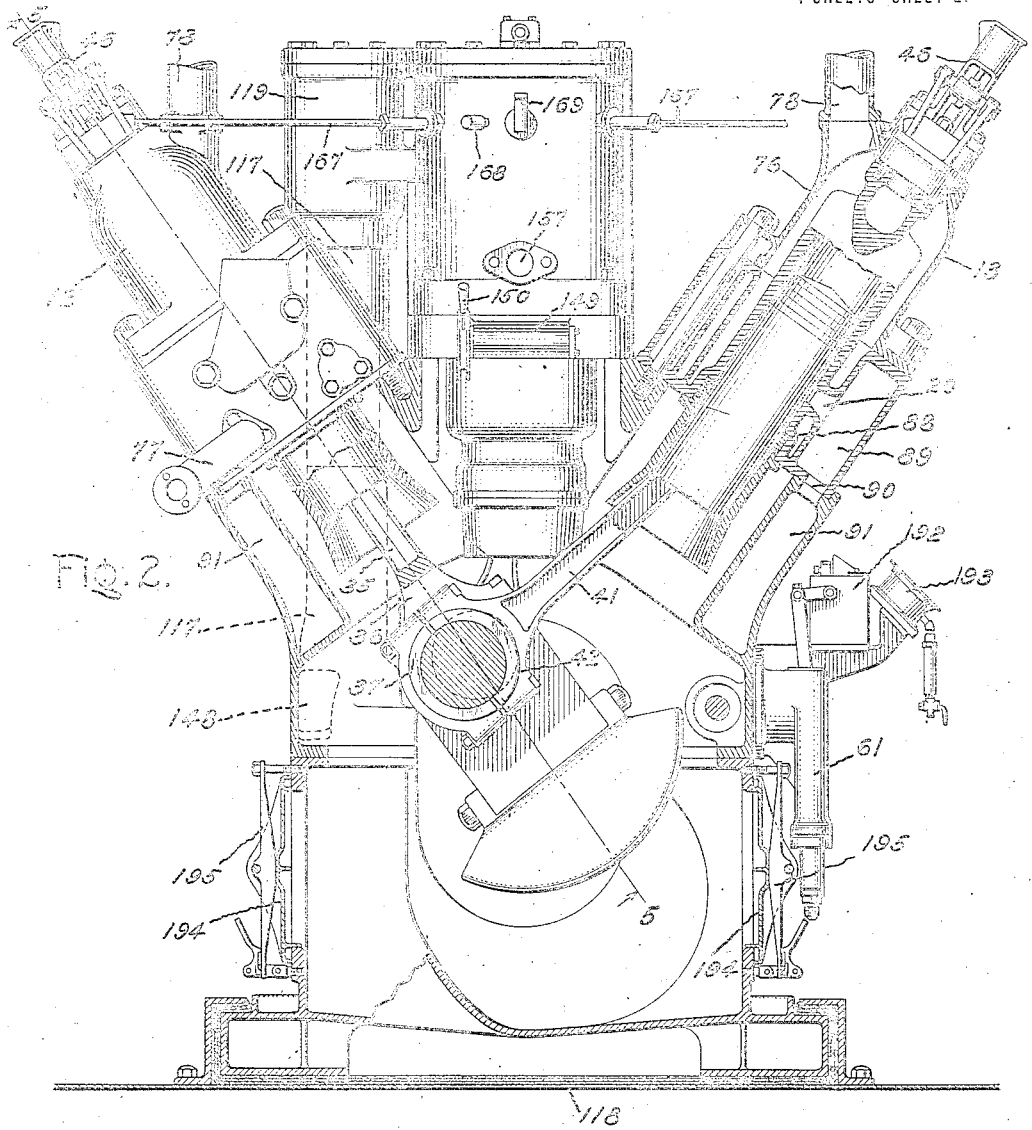
Figure 3:
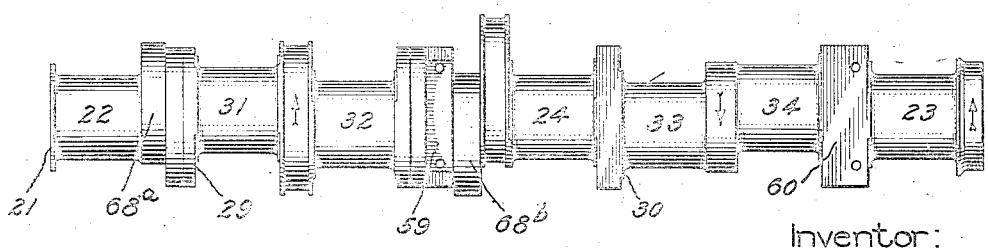
Figure 4:
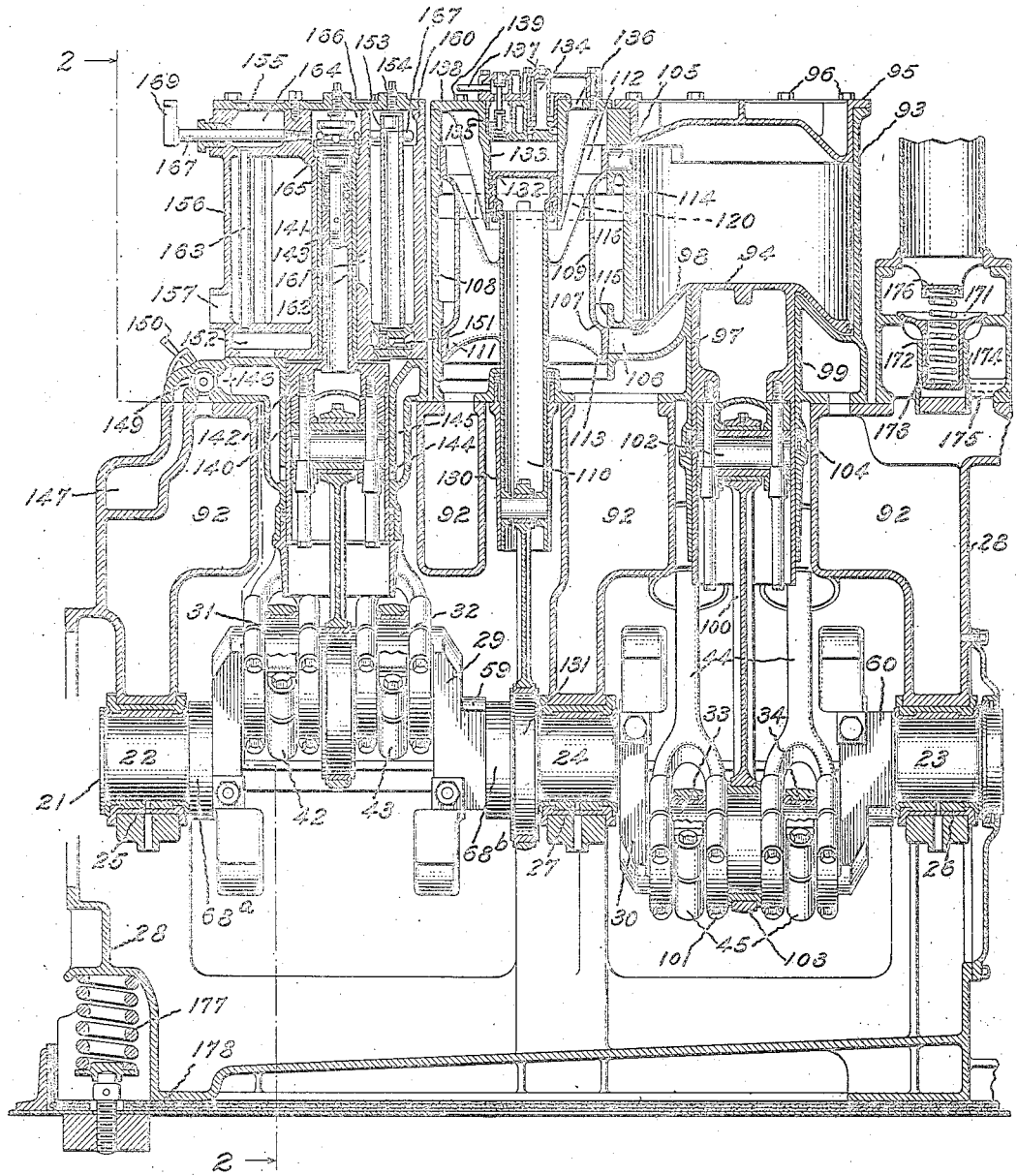

In the accompanying drawing, Figure 1 is a top plan view of an engine embodying my invention; Fig. 2 is a section taken on line 2—2, Fig. 4, with certain of the parts shown in section for purposes of illustration; Fig. 3 is a side elevation of a crank shaft; Fig. 4 is a vertical section taken on line 4—4, Fig. 1; Fig. 5 is a section taken on the line 5—5, Fig. 2; Fig. 6 is a top plan view of a pair of cylinders, as shown in Fig. 5, looking at them in the line of their axis; Fig. 7 is a detail view illustrating the arrangement for operating the fuel injectors; Fig. 8 is a similar view illustrating the arrangement for operating the fuel pumps, and Fig. 9 is a section taken on the line 9—9, Fig. 1.

Referring to the drawings, Fig. 1, 10 indicates generally the engine which, in the present instance, is shown as directly connected to an electric generator 11, which in the case of a gas electric car is the generator which supplies current to the motors for propelling it. The engine comprises eight cylinders arranged in sets of two each, there being four sets, as indicated at 12, 13, 14 and 15. The two cylinders of each set are arranged side by side in a plane parallel to the longitudinal axis of the engine, and the two sets 12 and 14 are arranged on one side of, and in a plane at an angle to, the central vertical plane of the engine, and the two sets 13 and 15 are similarly arranged on the opposite side of such central plane. The four cylinders of sets 12 and 14 thus lie in one plane, and the four cylinders of sets 13 and 15 lie in a second plane, the two planes being at an angle to each other, with the cylinders of the first two sets directly opposite those of the second two sets. This gives a V-shaped arrangement of the cylinders, the angle in the present instance being about 72°. The two cylinders of each set, as best shown in Fig. 5, which is a section through the set 12, are arranged side by side in parallel relation to each other and have a common combustion chamber 16. This combustion chamber may be of any suitable contour, but it is preferably of a flattened cone-shape, such as is described and claimed in the application of Henri G. Chatain, Serial No. 121,081, filed September 19, 1916. The piston 17 in the one cylinder controls the exhaust ports 18, and the piston 19 in the other cylinder controls the scavenging ports 20. 21 indicates the crank shaft of the engine. Referring particularly to Figs. 3 and 4, it comprises two end bearing sections 22 and 23 and an intermediate bearing section 24 supported in suitable bearings 25, 26 and 27 in the engine base and crank case 28. The shaft has in substance only two cranks, a crank 29 located between bearings 22 and 24, and a crank 30 located between bearings 23 and 24, such cranks being offset from each other by 180°. The crank 29 has two bearing sections 31 and 32 which are for the cylinders of sets 12 and 13, and the crank 30 has two bearing sections 33 and 34 which are for the cylinders of sets 14 and 15.

Referring again to Fig. 5, the piston 17 is connected to crank section 31 by a connecting rod 35 which is pivoted at one end to the piston 17, which is of the trunk type, in any suitable manner, and at the other end is provided with a pair of forked members 36 which engage the bearing sleeve 37 on crank section 31, which sleeve extends the full length of the crank section. The piston 19 is connected in a similar manner to crank 32 by the connecting rod 38 having the forked member 39, which engages the bearing sleeve 40 which is similar to sleeve 37. The crank section 31 is angularly displaced from the crank section 32 by a few degrees in the direction of rotation so as to obtain the desired lead of the piston controlling the exhaust ports over that controlling the scavenging ports, this arrangement being desirable in engines of this type, as is well understood. The pistons of the set of cylinders 13 which are directly opposite to the set of cylinders 12, are connected to these same crank sections 31 and 32, the ends of the connecting rods which connect them to such sections being located between the forked members 36 and 39 respectively and in engagement with the bearing sleeves 37 and 40 so as to oscillate thereon. The connecting rod for one of the pistons of set 13 is shown at 41 in Fig. 2, and the arrangement of its connection with the crank section 31 is shown at 42 in Fig. 2, and also in Figs. 4 and 5. In these latter two figures 43 indicates the one end of the connecting rod for the piston of the other cylinder of the set 13 and shows the manner of its attachment to crank section 32. It will be understood that the arrangement is the same as is that of connecting rod 41. The angular displacement of the crank sections 29 and 30 relative to each other gives the desired lead of the one piston over the other in the case of the set of cylinders 13, the same as in the case of the set 12. By the use of bearing sleeves 37 and 40, which extend the full length of the bearing sections, the force of the firing stroke of each set of cylinders is distributed through the sleeve over the entire length of the crank, and since the two sets fire one after the other, it will be seen that by the use of such sleeves the crank need be made little, if any, longer to accommodate the two connections than it would for a single one, since it is only required to take the force of one firing stroke at a time. The crank sections 33 and 34 are angularly displaced relative to each other, the same as are crank sections 31 and 32, and the connections of the pistons of the two sets of cylinders 14 and 15 to them is the same as that just described in connection with sets of cylinders 12 and 13. The connecting rods for the pistons of sets 14 and 15 are shown in part in Fig. 4 at 44 and 45.

46 indicates the fuel injectors, there being one for each set of cylinders. They are arranged directly on top of the cylinders with their bases bolted directly thereto and may be of any suitable structure. Each injector has an operating lever 47 to the end of which is connected a rod 48 which extends down adjacent to the crank shaft. It passes into the crank case through a guide and packing 49 and its end is fastened to a head 50 (Fig. 5) which slides in a sleeve 51. Adjacent the lower end of the head 50 is an arm 52 (Fig. 7) pivoted to a block 53 and having an enlarged end 54 which is directed under the lower end of the head 50. The arm 52 has a nose 55 which engages a spring 56 seated in a recess in block 53, which spring serves to hold the end of the arm in engagement with head 50. The block 53 is locked in position by a bolt 56$^a$ upon which it may be slidably adjusted to vary the timing of the fuel valve. The fuel injector is actuated by a cam 57 located on the main crank shaft of the engine. The valve of the fuel injector is biased toward closed position by a spring (not shown) as is usual, and the rod 48 is held in position to be actuated by the cam 57 by a spring 58. These springs tend to seat the valve very quickly and to somewhat cushion the movement and prevent undue hammering of the valve; the head 50 is provided with a flange or collar 50$^a$ which engages the end of sleeve 51. These parts are within the crank case and when the engine is in operation lubricant from the crank case will be splashed between the collar 50$^a$ and the end of the sleeve 51 and form an oil film which will serve to cushion the return movement of the parts. There is a single fuel injector for each set of cylinders, and as will be clear from Fig. 7, one cam 57 serves for each two opposed sets, i. e., there is one cam 57 for actuating the fuel injectors of the two sets of cylinders 12 and 13, and a second cam 57 for actuating the fuel injectors of the two sets of cylinders 14 and 15. The cam 57 for the two sets of cylinders 12 and 13 is located on a squared portion 59 of the crank shaft adjacent the crank 32, and that for the sets of cylinders 14 and 15 is located on a squared portion 60 of the crank shaft adjacent the crank 34. The cams are displaced from each other by 180° and with a clockwise rotation of the crank shaft, as seen from the generator end, give a firing order of 15, 14, 13, 12.

With engines of this type fuel pumps are provided for supplying measured charges of fuel to the fuel injectors to be blown into the cylinder by the blast air when the fuel valve is opened, and in the present instance I provide four fuel pumps, one for each set of cylinders. The pumps are arranged in two pairs attached to the side of the engine.

base. The two pumps of each pair are located side by side in a suitable casing and are operated from a single lever actuated by an eccentric on the crank shaft. Referring to Fig. 8, 61 indicates the casing of one pair of pumps, for example, the pumps which supply the two pairs of cylinders 12 and 13; 62 one of the pump cylinders, and 63 its plunger. It will be understood that the other pump cylinder of the pair is located in casing 61 directly behind this one. 64 indicates the actuating lever for the plungers for these two pumps. The pumps are shown as being of the variable zone displacement type, that is, of the type in which the quantity of fuel delivered is regulated by varying the region of reciprocation of the plunger, and for this purpose the lever 64 is fulcrumed on an eccentric 65 which is turned to raise and lower the fulcrum of the lever thus regulating the pumps as is well understood. As already stated, the two cylinders of each pair of pumps are placed side by side in the same casing, and the one end of the lever 64 is provided with two rollers 66 which rest on the ends of the two pump plungers to drive them simultaneously. The other end of the lever 64 carries a shoe 67 which engages an eccentric 68 on the crank shaft. The location of the two fuel pump eccentrics on the crank shaft is shown in Figs. 3 and 4, the same being indicated by numerals 68$^a$ and 68$^b$. Located above each pair of pumps is a hand lever 69 having a rod 70 which extends down through casing 61 and engages the end of lever 64 which carries the rollers 66. The pumps may be actuated by hand by moving the lever. Two hooks are provided in connection with the hand lever 69, a hook 71 for hooking the lever down, thus putting the pumps out of service, and a hook 72 for hooking it up out of the way. The eccentrics 68$^a$ and 68$^b$ are arranged to operate the pumps so as to deliver fuel to the respective injectors at a time when they are closed, and the two fuel pump eccentrics are accordingly displaced about 180° from the two cams 57 which open the corresponding injectors. It will be understood that the other pair of pumps is arranged after the same manner as the pair just described.

The exhaust ports 18 of the two sets of cylinders 12 and 14 are connected to an exhaust conduit 73 (Fig. 1) and the exhaust ports of the two sets of cylinders 13 and 15 are connected to an exhaust conduit 74. These two conduits merge into a common conduit 75 which leads to a suitable muffler (not shown).

Each set of cylinders is similarly constructed, and, as shown in Figs. 2 and 5, in connection with sets 12 and 13, they are provided with water jackets 76 for the circulation of cooling water. The water jackets extend well over the heads of the cylinders and are arranged to bring the cooling water up so as to cool the fuel injectors. This arrangement forms the subject matter of my application, Serial No. 112,843, filed of even date herewith, in which application it is described more in detail and claimed. 77 indicates the inlet pipes through which cooling water is fed to the jackets and 78 the outlet pipes by which it is conducted away therefrom. The inlet pipes 77 are connected by pipes 79 and 80 to a common pipe 81 which leads from a radiator (not shown) and the outlet pipes 78 are connected by pipes 82 and 83 to a common pipe 84 which leads to such radiator. In the case of a car engine the radiator is advantageously placed on the roof of the car, and in Fig. 1, 85 indicates a tank which may be suitably mounted on the car, and connected to pipes 79 and 81 by pipes 86 and 87, and into which the water from the radiator and engine jackets may be drained in cold weather to prevent freezing.

The cylinders and pistons are lubricated by splash lubrication in the usual manner, and in the walls of each of the cylinders scraper rings 88 are provided for scraping back lubricant to prevent an excessive amount from passing up into the cylinder.

Surrounding the cylinders outside the water jackets are chambers 89 (Fig. 2) which form a part of the receiver for the scavenging air and from which scavenging air is supplied to the cylinders through the scavenging ports when they are uncovered by the pistons which control them. This figure illustrates the manner in which the ports 20 lead from the chambers 89 across the water-cooling space. The chambers 89 communicate directly through openings 90 with another portion 91 of the scavenging air receiver and these portions 91 in turn communicate with the portions of the receiver indicated at 92 in Fig. 4. It will be noted that all the space available in the crank case and that surrounding the cylinders is utilized as a scavenging air receiver. This has the advantage that it puts to a useful purpose space which would otherwise be wasted and also, since a portion of the receiver directly surrounds the cylinders, avoids the use of piping connections for conveying the scavenging air from the receiver to the scavenging ports.

Referring now to Fig. 4, 93 indicates the cylinder of the scavenging pump and 94 the piston. It is located vertically over the crank shaft between the two sets of cylinders 14 and 15 and is supported by the engine frame 28. 95 indicates the cylinder head which is removable and is held in place by bolts 96. The pump is double acting and the piston comprises a trunk 97 having a flanged head 98. The trunk 97 slides in a guide cylinder 99 which guides the piston, and it is connected by a rod 100 to a bearing 101 on the crank shaft, which bearing is located between crank sections 33 and 34. 102 indicates the wrist pin which connects the rod 100 to the trunk 97 of the piston 94, and 103 indicates the strap by which such rod is connected to the bearing 101. 104 indicates oil scraper rings located in the wall of the cylinder 99 to scrape back lubricant as referred to above in connection with the scraper rings 88 in the engine cylinders. 105 and 106 indicate ports connected with the upper and lower ends of cylinder 93 and which act alternately as exhaust ports and inlet ports. The ports are controlled by a reciprocating valve 107 which works in a casing 108. The valve 107 comprises an annular wall 109 fastened to a hollow stem 110 by webs 111, and two enlarged ends 112 and 113 which slide in short cylinders 114 and 115 and control directly the ports 105 and 106. The wall 109 is spaced from the wall of casing 108 to form an annular chamber 116 which is the admission or suction chamber from which air is supplied to the cylinder 93. The space inside the annular wall 109 communicates with the scavenging air receiver 92. Air is supplied to the admission or suction chamber 116 through a conduit 117 (Fig. 2) which in the case of a car engine preferably connects with a trunk beneath the car floor (not shown) through an opening 118. The upper end of the conduit 117 terminates in a valve casing 119 which communicates with the suction chamber 116 through a passage 120 (Figs. 4 and 9). Within the valve casing 119 is a valve 121 (Fig. 9) normally held in the upper position as shown by a spring 122, and when in this position the conduit 117 is in full communication with the suction chamber 116. The valve 121 is adapted to be moved by pressure to a position where it seats on the valve seat 123 and shuts off such communication. The valve 121 comprises an annular portion 124 which fits casing 119 and a smaller portion which forms a cylinder 125 and to which is attached guide wings 126. Supported within the valve casing 119 is a fixed piston 127 over which the cylinder 125 slides. The piston 127 has an axial opening 128 through it, and at one end is provided with a ball valve 129 adapted to close the opening 128. The purpose of the piston 127 and the ball valve 129 is to cushion the movement of the valve 121 in its movement from the position shown to the position where it seats on the valve seat 123. The valve 121 forms a part of the air starting system for the engine, as will be explained hereinafter. The hollow stem 110 slides in a guide cylinder 130 and is connected to an eccentric 131 on the crank shaft located directly adjacent the bearing 24. The reciprocating motion of the valve 107 is also utilized to operate a small compressor for supplying air for the air braking system of the car, and in the present instance air for starting also, and to this end the upper end of the stem 110 carries a piston 132 which slides in a cylinder 133. 134 indicates the suction valve and 135 the discharge valve for cylinder 133. On the suction stroke air is drawn into the cylinder 133 from the scavenging pump receiver 92 through an opening 136, and the suction valve 134, and on the discharge stroke it is discharged past the discharge valve 135 to the delivery conduit 137 which connects with the usual storage reservoir (not shown). The suction and discharge valves 134 and 135, and also the cylinder 133, are carried by a cylinder head 138 held in place by bolts 139, and can be readily removed for inspection and repair of the parts.

Located between the two sets of cylinders 12 and 13, and vertically over the crank shaft, is a two-stage reciprocating air compressor for supplying blast air for the fuel injectors. Referring to Fig. 4, 140 indicates the cylinder of the first or low pressure stage, and 141 the cylinder of the second or high pressure stage. They are arranged in vertical alinement, and are supported on the engine frame 28. 142 indicates the piston of the low pressure stage, formed integral with the head of which is the piston 143 of the high pressure stage. Air is supplied to the cylinder 140 through ports 144 in the cylinder wall which connect with an annular chamber 145 surrounding it, and to which air is supplied through a passage 146 which communicates with scavenging air receivers 92 and also with a chamber 147 connected with the conduit 117, the point of connection being indicated by dotted lines in Fig. 2 at 148. A valve 149 having an operating handle 150 is provided, by means of which passage 146 may be connected with either the receiver 92 or chamber 147, as desired. The valve 149 may also be utilized to throttle the suction side of the compressor to regulate it. Air from the first stage of the compressor is discharged through discharge valves 151 to a chamber 152. A number of these discharge valves are provided equally spaced around the cylinder 141. They are preferably of the disk type, and are held in position by tubes 153 on the upper ends of which bear threaded bolts 154 located in a head 155. Referring to Fig. 1, where the bolts 154 are shown in place, it will be seen that in the present instance five discharge valves are utilized. Surrounding the cylinder 141 is a water jacket 156 to which cooling water is admitted through inlet 157 by a pipe 158 (Fig. 1) and from which it is discharged by the two pipes 159, one on each side of the jacket. The pipes 158 and 159 connect with the cooling water system for the engine cylinder as shown in Fig. 1. The tubes 153 are arranged in casings 160 which are connected by openings 161 to admission ports 162 in the wall of the high pressure cylinder 141. Extending across the cooling chamber formed by the jacket 156 are a series of tubes 163 which connect the chamber 152 into which the first stage of the compressor discharges to a chamber 164, from which it is fed through the casing 160 to the cylinder 141 of the second stage. From this cylinder the air is discharged through a discharge valve 165 to a chamber 166 from which it is led by a series of pipes 167 directly to the fuel injectors 46 (see Figs. 1 and 2). In the present instance there are four fuel injectors and hence there are four pipes 167. By this arrangement I avoid the use of storage reservoirs for the high pressure air required to blow the fuel into the engine. 168 indicates a safety valve for the low presssure chamber 164 and 169 a safety valve for the high pressure chamber 166. Complete details of this two-stage compressor are not shown and described, as it is not essential to a complete understanding of the invention claimed herein and forms the subject matter of a separate application, Serial No. 112,844, filed of even date herewith.

The engine is started by means of supplying compressed air to the scavenging pump to operate it as an air motor. To this end a starting pipe 170 (Figs. 1 and 9) is provided which leads from an air supply reservoir (not shown) and connects with the valve casing 119 above the valve 121 so that when compressed air is admitted it will act on the valve to force it against the seat 123 where it shuts off communication between the conduit 117 and the valve casing 119, and at the same time places the space above it and hence pipe 170 in communication with passage 120. Connected with the scavenging air receiver 92 is a pressure relief or vent valve 171 which, when opened, connects such receiver to atmosphere. This is opened whenever the engine is to be started so as to prevent undue pressure being built up in the receiver, thus retarding the starting operation. The valve is normally held seated by a spring 172 and is provided with an extension 173 forming a piston which slides in a cylinder 174. Connected with the cylinder 174 beneath the piston 173 is a branch pipe 175 leading from air starting pipe 170 so that whenever air is admitted to the air starting pipe 170 to start the engine it will also act on the piston 173 to open the valve 171. 176 is a fixed cup-shaped member which forms a seat for one end of spring 172, and also acts as a stop to limit the opening movement of valve 171. The spring 172 is strong enough to hold the valve 171 seated against normal scavenging air pressure, but will permit the valve to open in case of excess pressure. In this respect it functions as a safety valve for the scavenging air receiver. This air starting arrangement is not claimed herein, as it forms the subject matter of my application Serial No. 112,841 filed of even date herewith.

The engine and generator as a whole are flexibly supported by springs, one of which is indicated at 177, Fig. 4, and they are also supported on a felt cushion as indicated at 178. The purpose of this arrangement in the case of a gas-electric car is to prevent the vibration of the engine being transmitted to the car.

Referring now to Fig. 1, 180 indicates a fuel tank which is connected to the fuel pumps by pipe 181. The engine is designed to operate on heavy fuel, and at 182 is shown a second fuel tank which contains a lighter oil for starting purposes and which is connected to the pipe 181 by a pipe 183. Suitable valves as indicated at 184 and 185 are provided in pipes 181 and 183 to control the fuel supplies. 186 indicates the controller box. It is bolted directly to the engine frame and the electrical connections from it pass down directly through an opening in the bottom of the car to the motors. 187 indicates the control lever for the fuel pumps, it being suitably connected to turn the eccentrics 65 to raise and lower the fulcrum of the fuel pump actuating levers 64. In the present instance a control handle arrangement, such as is shown in my Patent 1,094,406, April 21, 1914, is indicated. 188 indicates the handle of the reversing switch and 189 the handle of the controller for the electrical connections. It is to be noted that the controller box, since it is directly mounted on the engine frame, will partake of the movements of the frame. This is of particular importance in a case like the present where the engine and generator are flexibly supported, since if the controller box were supported independently of the engine frame, the frame in vibrating would move relative to the controller box and hence vary the adjustments of the regulating mechanisms independently of the control levers. This arrangement also has the advantage that it greatly decreases the number of electrical connections and the number of mechanical joints.

190 indicates a hand lever for turning the crank shaft manually to bring the parts into position for starting the engine. 192 (Fig. 2) indicates a lubricating oil pump which is used to supply lubricant for the piston heads of the engine, and 193 indicates a pressure gage. The engine has an inclosed crank case and 194 indicates doors or panels which are held in place by suitable fastenings 195 and which may be removed to give access to the crank case.

The operation is as follows: To start the engine the crank shaft, if necessary, is turned by means of handle 180 to bring the parts of the scavenging pump to the proper position, after which starting air is admitted to pipe 170. As soon as this air is turned on it acts automatically to open the pressure relief valve 171 and to move the valve 121 against seat 123 where it cuts off communication between conduit 117 and admission passage 120 and connects passage 120 to pipe 170. The starting air is then admitted to the scavenging air pump cylinder 93 on one side or the other of the piston 94 according to the location of the valve 107, the other side being connected to the scavenging air receiver. The scavenging pump is thus operated as an air motor, as will be obvious, to set the crank shaft in motion, and the shaft will in turn operate the pistons of the respective sets of cylinders 12, 13, 14 and 15, the fuel pumps, the air compressor which furnishes the blast air to the fuel injectors, the valves of the fuel injectors, and the air brake and starting air compressor. The first named air compressor will quickly provide the necessary pressure for the blast air, and as soon as the cylinders begin to fire the starting air is shut off. This permits the valve 121 to open and connect suction conduit 117 to the scavenging pump valve casing 108. At the same time the spring 172 closes the relief valve 171. The scavenging air pump then operates in its normal manner to supply scavenging air to the receiver 92. The fuel control handle 187 is shifted back and forth to move the eccentrics 65 to vary the amount of fuel supplied by the pumps to the fuel injectors.

It will be noted that all the various moving parts of the engine are operated from the crank shaft and that no countershafts whatever are required. Furthermore, as will be appreciated from a consideration of Figs. 3 and 4, the bearing surfaces for the blast air compressor, and the scavenging air pump, which are located on the two cranks 29 and 30 between the bearing sections 31 and 32, and 33 and 34 respectively, occupy space on the crank shaft which would otherwise not be utilized. This is likewise true of the spaces on the crank shaft which are occupied by the cams for the fuel valves and the eccentrics for the fuel pumps and the scavenging pump valve. In other words, due to the disposition of the various auxiliary apparatus which forms a part of the engine, the crank shaft is so utilized that it need be made little, if any, longer than would be required for the engine cylinders alone. The bearing surfaces for the air compressor and scavenging pump and the several eccentrics are made larger in diameter than the adjacent parts of the shaft so as to strengthen it. In Fig. 3 the arrow on the right hand end of the shaft, which is the generator end, indicates the direction of rotation of it, and the arrows on the two cranks 29 and 30 indicate the directions in which they are moving.

By my improved arrangement I obtain a comparatively small compact engine and one which develops large power per unit of weight. It is also so arranged that although compact practically all the parts are accessible for inspection and repair from the top, this being due to the V-shaped relation of the cylinders with the various auxiliary apparatus located between them and vertically over the crank shaft.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. In an internal combustion engine, the combination of a base, a shaft journaled therein, cylinders located on opposite sides of the shaft and in V-shaped relation to each other, pistons in the cylinders connected to the shaft, a scavenging air receiver, a pump having a reciprocating piston located between the cylinders and vertically over the shaft for supplying scavenging air to the receiver, a positively actuated reciprocating valve for the pump also located over the shaft and parallel to the pump, and means connecting the pump piston and the valve to the shaft.

2. In an internal combustion engine, the combination of a base, a shaft journaled therein, cylinders located on opposite sides of the vertical plane of the shaft and in V-shaped relation to each other, pistons in the cylinders, cranks on the shaft, connecting rods connecting the pistons to said cranks, a scavenging air receiver, fuel injectors for the cylinders, a scavenging pump for supplying air to the receiver, a compressor for supplying blast air to the fuel injectors, said pump and compressor being located side by side and vertically over the crank shaft between the cylinders, and means for operating the pump and the compressor from the crank shaft.

3. In an internal combustion engine, the combination of a base, a shaft journaled therein, cylinders located on opposite sides of the vertical plane of the shaft and in V-shaped relation to each other, fuel injectors for the cylinders, a scavenging air receiver, a pump located between the cylinders and vertically over the shaft for supplying scavenging air to the receiver, a compressor located between the cylinders adjacent the pump for supplying blast air for the fuel injectors, removable heads for the cylinders of said pump and compressor, and rods connecting their plungers to the said shaft.

4. In an internal combustion engine, the combination of a shaft, cylinders located on opposite sides of the vertical plane of the shaft, pistons in the cylinders, rods connecting them to the shaft, a scavenging pump, a casing having a reciprocating valve for the pump therein, and a compressor, all located side by side between the cylinders and vertically over the shaft, rods connecting them to the shaft, and removable heads for the valve casing and for the cylinder of the pump and compressor.

5. In an internal combustion engine, the combination of a shaft, cylinders located on opposite sides of the vertical plane of the shaft, pistons in the cylinders, rods connecting them to the shaft, an air pump located vertically over the shaft, a casing adjacent the pump and having a reciprocating valve therein for the pump, a piston on the end of the valve stem, a removable head for the valve casing, and a cylinder for said piston carried by the head and removable with it.

6. In an internal combustion engine, the combination of a shaft, cylinders located on opposite sides of the vertical plane of the shaft, pistons in the cylinders, rods connecting them to the shaft, an air pump located vertically over the shaft, a casing adjacent the pump and having a reciprocating valve therein for the pump, a piston on the end of the valve stem, a removable head for the valve casing, a cylinder for said piston carried by the head and removable with it, and suction and discharge valves for the last named cylinder also carried by the head.

7. In an internal combustion engine, the combination of a crank shaft, cylinders located on opposite sides of the vertical plane of the shaft and in V-shaped relation to each other, pistons for the cylinders which are connected to the crank shaft, fuel injectors for the cylinders, an operating rod for each injector which extends along the side of the cylinder appurtenant to such injector and terminates at a point directly adjacent the crank shaft, and a cam carried by the crank shaft which engages the operating rods for a cylinder on each side of the crank shaft.

8. In an internal combustion engine, the combination of a crank shaft, cylinders located on opposite sides of the vertical plane of the shaft and in V-shaped relation to each other, pistons for the cylinders which are connected to the crank shaft, fuel injectors for the cylinders, an operating rod for each injector which extends along the side of the cylinder appurtenant to such injector and terminates at a point directly adjacent the crank shaft, and cams carried by the crank shaft which engage the operating rods of two opposed cylinders.

9. In an internal combustion engine, the combination of a base, a crank shaft journaled therein, two cylinders one on each side of the vertical plane of the shaft and in V-shaped relation to each other, pistons for the cylinders, rods connecting the pistons to bearings on the crank shaft, a fuel injector for each cylinder, a fuel pump for supplying fuel to each injector, a cam on the shaft which actuates both fuel injectors, and an eccentric on the shaft which actuates both fuel pumps.

10. In an internal combustion engine, the combination of a base, a shaft journaled therein, a cylinder structure located on each side of the vertical plane of the shaft and in V-shaped relation to each other, each structure comprising two cylinders arranged side by side and having a common combustion chamber, one of said cylinders being provided with admission ports and the other with exhaust ports, pistons in the cylinders which control said ports, a crank on the shaft having two bearing sections, one of which is angularly displaced slightly relative to the other, rods connecting the pistons to said bearing sections, the pistons of opposed cylinders being connected to the same bearing section, the angular displacement of the one bearing section over the other being such as to give the pistons controlling the exhaust ports a lead over those controlling the scavenging ports, a fuel injector for each cylinder structure, and a cam located on the shaft to one side of the crank for operating both injectors.

11. In an internal combustion engine, the combination of a base, a shaft journaled therein, a cylinder structure located on each side of the vertical plane of the shaft and in V-shaped relation to each other, each structure comprising two cylinders arranged side by side and having a common combustion chamber, one of said cylinders being provided with admission ports and the other with exhaust ports, pistons in the cylinders which control said ports, a crank on the shaft having two bearing section one of which is angularly displaced slightly relative to the other, rods connecting the pistons to said bearing sections, the pistons of opposed cylinders being connected to the same bearing section, the angular displacement of the one bearing section over the other being such as to give the pistons controlling the exhaust ports a lead over those controlling the scavenging ports, a fuel injector for each cylinder structure, a pump for supplying fuel to each injector, and an eccentric on the shaft adjacent the crank for actuating both pumps.

12. In an internal combustion engine, the combination of a base, a shaft journaled therein, a cylinder structure located on each side of the vertical plane of the shaft and in V-shaped relation to each other, each structure comprising two cylinders arranged side by side and having a common combustion chamber, one of said cylinders being provided with admission ports and the other with exhaust ports, pistons in the cylinders which control said ports, a crank on the shaft having two bearing sections, one of which is angularly displaced slightly relative to the other, rods connecting the pistons to said bearing sections, the pistons of opposed cylinders being connected to the same bearing section, the angular displacement of one bearing section over the other being such as to give the pistons controlling the exhaust ports a lead over those controlling the scavenging ports, a fuel injector for each cylinder structure, a pump for supplying fuel to each injector, a cam on one side of the crank for actuating the fuel valves, and an eccentric on the other side of it for actuating the pumps.

13. In an internal combustion engine, the combination of a base, a shaft journaled therein, a cylinder structure located on each side of the vertical plane of the shaft and in V-shaped relation to each other, each structure comprising two cylinders arranged side by side and having a common combustion chamber, one of said cylinders being provided with admission ports and the other with exhaust ports, pistons in the cylinders which control said ports, a crank on the shaft having two bearing sections, one of which is angularly displaced slightly relative to the other, rods connecting the pistons to said bearing sections, the pistons of opposed cylinders being connected to the same bearing section, the angular displacement of the one bearing section over the other being such as to give the pistons controlling the exhaust ports a lead over those controlling the scavenging ports, a fuel injector for each cylinder structure, a pump for supplying fuel to each injector, a compressor having a reciprocating plunger located vertically over the crank shaft between the cylinders, a cam on the shaft at one side of the crank for actuating the injector, an eccentric on the other side of the crank for actuating the fuel pumps, a bearing located between the two bearing sections of the crank, and a rod connecting the pump plunger to it.

14. The combination in an internal combustion engine, of a base, a scavenging air receiver formed therein, a cylinder structure mounted directly on the base, a cooling jacket for the cylinder structure, and a wall surrounding the lower end of said jacket and forming a scavenging air chamber, said chamber being in direct communication with the receiver.

15. In an internal combustion engine, the combination of a base, cylinder structures mounted on the base, said structures having scavenging and exhaust ports and pistons which control such ports, cooling jackets for the cylinder structures, walls surrounding the lower ends of the jackets and forming air chambers, said walls being supported on the base, conduits extending across the space formed by the cooling jackets and connecting the chambers to the scavenging ports, a scavenging air receiver in the base which is in direct communication with the air chambers, and a pump for supplying scavenging air to the receiver.

16. In an internal combustion engine, the combination of a base, cylinder structures mounted on the base in V-shaped relation to each other and having walls surrounding their lower ends which form air chambers, a scavenging air receiver located in the base which is in direct communication with said air chambers, and a scavenging air pump located between the cylinder structures and supported by the base, said pump discharging directly to the scavenging air receiver.

17. In an internal combustion engine, the combination of a base, a shaft journaled therein, four cylinders, two on each side of the shaft, arranged in V-shaped relation to each other, pistons in the cylinders, a crank on the shaft having two bearing sections, the piston of opposed cylinders being connected to the same bearing section, a pumping apparatus having a reciprocating plunger located vertically over the crank shaft between the cylinders, a bearing on said crank between the two bearing sections, and a rod connecting the pump plunger to it.

18. In an internal combustion engine, the combination of a base, a shaft journaled therein, four cylinders, two on each side of the shaft, arranged in V-shaped relation to each other, pistons in the cylinders, a crank on the shaft having two bearing sections, the pistons of opposed cylinders being connected to the same bearing section, a pump having a reciprocating plunger, a reciprocating valve for the pump, a bearing on said crank between the two bearing sections, a rod connecting the pump to it, an eccentric on the shaft to one side of the crank, and a rod connecting the valve to said eccentric.

19. In an internal combustion engine, the combination of a base, a shaft journaled therein, a cylinder structure located on each side of the vertical plane of the shaft and in V-shaped relation to each other, each structure comprising two cylinders arranged side by side and having a common combustion chamber, one of said cylinders being provided with admission ports and the other with exhaust ports, pistons in the cylinders which control said ports, a crank on the shaft having two bearing sections, one of which is angularly displaced slightly relative to the other, and rods connecting the pistons to said bearing sections, the pistons of opposed cylinders being connected to the same bearing section, the angular displacement of one bearing section over the other being such as to give the pistons controlling the exhaust ports a lead over those controlling the scavenging ports.

20. In an internal combustion engine, the combination of a base, a shaft journaled therein, a cylinder structure located on each side of the vertical plane of the shaft and in V-shaped relation to each other, each structure comprising two cylinders arranged side by side and having a common combustion chamber, one of said cylinders being provided with admission ports and the other with exhaust ports, pistons in the cylinders which control said ports, a crank on the shaft having two bearing sections, one of which is angularly displaced slightly relative to the other, rods connecting the pistons to said bearing sections, the pistons of opposed cylinders being connected to the same bearing section, the angular displacement of the one bearing section over the other being such as to give the pistons controlling the exhaust ports a lead over those controlling the scavenging ports, a pumping apparatus having a reciprocating plunger arranged between the cylinders and over the shaft, a bearing on said crank between the bearing sections, and a rod connecting the pump plunger to it.

21. In an internal combustion engine, the combination of a base, a shaft journaled therein, a cylinder structure located on each side of the vertical plane of the shaft and in V-shaped relation to each other, each structure comprising two cylinders arranged side by side and having a common combustion chamber, one of said cylinders being provided with admission ports and the other with exhaust ports, pistons in the cylinders which control said ports, a crank on the shaft having two bearing sections, one of which is angularly displaced slightly relative to the other, rods connecting the pistons to said bearing sections, the pistons of opposed cylinders being connected to the same bearing section, the angular displacement of the one bearing section over the other being such as to give the pistons controlling the exhaust ports a lead over those controlling the scavenging ports, a scavenging receiver, a pump located vertically over the shaft and between the cylinders for supplying air to the receiver, a reciprocating plunger and a reciprocating valve for the pump, a bearing on the crank to which the plunger is connected, and an eccentric on the shaft to one side of the crank to which the valve is connected.

22. In an internal combustion engine, the combination of a base, a shaft journaled therein and having a plurality of cranks, each crank having two bearing sections, one of which is angularly displaced slightly from the other, two cylinder structures associated with each crank and located on opposite sides of the shaft in V-shaped relation to each other, each structure comprising two cylinders having a common combustion chamber, pistons in the cylinders, the pistons of opposed cylinders being connected to the same bearing section, a scavenging pump and a compressor located between the cylinders vertically over the shaft, a bearing between the two sections of one of said cranks to which said pump is connected, and a bearing between the two sections of another of said cranks to which the compressor is connected.

23. In an internal combustion engine, the combination of a base, a shaft journaled therein and having a plurality of cranks, each crank having two bearing sections, one of which is angularly displaced slightly from the other, two cylinder structures associated with each crank and located on opposite sides of the shaft in V-shaped relation to each other, said structure comprising two cylinders having a common combustion chamber, pistons in the cylinders, the piston of opposed cylinders being connected to the same bearing section, a scavenging pump, a reciprocating valve for the pump, and a compressor located side by side between the cylinders vertically over the crank shaft, a bearing between the two sections of one crank shaft to which the pump is connected, an eccentric on the shaft to one side of such bearing to which the valve is connected, and a bearing between the two sections of another of said cranks to which the compressor is connected.

24. In an internal combustion engine, the combination of a base, a shaft journaled therein and having a plurality of cranks, each crank having two bearing sections, one of which is angularly displaced slightly from the other, two cylinder structures associated with each crank and located on opposite sides of the shaft in V-shaped relation to each other, each structure comprising two cylinders having a common combustion chamber, pistons in the cylinders, the piston of opposed cylinders being connected to the same bearing section, a scavenging pump, a reciprocating valve for the pump, and a compressor located side by side between the cylinders vertically over the crank shaft, a bearing between the two sections of one crank shaft to which the pump is connected, an eccentric on the shaft to one side of such bearing to which the valve is connected, a bearing between the two sections of another of said cranks to which the compressor is connected, a fuel pump for each cylinder structure, said pumps being arranged in pairs, and an eccentric on the shaft for actuating each pair of fuel pumps.

25. In an internal combustion engine, the combination of a base, a shaft journaled therein and having a plurality of cranks, each crank having two bearing sections, one of which is angularly displaced slightly from the other, two cylinder structures associated with each crank and located on opposite sides of the shaft in V-shaped relation to each other, each structure comprising two cylinders having a common combustion chamber, pistons in the cylinders, the pistons of opposed cylinders being connected to the same bearing section, a scavenging pump, a reciprocating valve for the pump, and a compressor located side by side between the cylinders vertically over the crank shaft, a bearing between the two sections of one crank shaft to which the pump is connected, an eccentric on the shaft to one side of such bearing to which the valve is connected, a bearing between the two sections of another of said cranks to which the compressor is connected, a fuel injector for each cylinder structure having an operating rod which extends down adjacent the shaft, a pump for supplying fuel to each injector, said pumps being arranged in pairs, a cam on the shaft which actuates the rods of the fuel injectors of each two opposed cylinder structures, and an eccentric on the shaft for actuating each pair of pumps.

26. In an internal combustion engine, the combination of a base, a shaft journaled therein, cylinders on opposite sides of the vertical plane of the shaft and arranged in V-shaped relation to each other, fuel injectors for the cylinders, fuel pump means operated from the shaft for supplying fuel to the injectors, a compressor located vertically over the shaft between the cylinders and having its plunger connected to the crank shaft, and pipes which connect the delivery side of the compressor directly to the injectors to supply blast air thereto.

27. In an internal combustion engine, the combination of a plurality of cylinders, pistons for the cylinders, connecting rods connecting the pistons to the crank shaft, a fuel injector for each cylinder, pump means operated from the crank shaft for supplying fuel to the fuel injectors, a compressor comprising a cylinder and a piston for supplying blast air to the fuel injectors, a rod connecting the compressor piston to the crank shaft, operating rods for the fuel injectors which extend along the side of the engine cylinders and terminate at a point directly adjacent the crank shaft, and cams carried by the crank shaft which engage the operating rods for actuating the fuel valves.

28. In an internal combustion engine, the combination of a cylinder structure comprising two cylinders arranged side by side and having a common combustion chamber, one of said cylinders being provided with admission ports and the other with exhaust ports, pistons in the cylinders which control said ports, a shaft having a crank thereon provided with two bearing sections, one of which is angularly displaced slightly relative to the other, rods connecting the pistons to said bearing sections, the angular displacement of the one bearing section over the other being such as to give the piston controlling the exhaust port a lead over that controlling the scavenging port, a fuel injector for supplying fuel to said common combustion chamber, a fuel pump connected to the injector, an operating rod for the injector which extends along the side of the cylinder and terminates at a point directly adjacent the shaft, and a cam on the shaft which engages the operating rod to actuate the fuel valve.

29. In an internal combustion engine, the combination of a plurality of cylinder structures arranged in angular relation to each other and each comprising two cylinders located side by side and having a common combustion chamber, one of said cylinders being provided with admission ports and the other with exhaust ports, pistons in the cylinders which control said ports, a shaft having cranks thereon, each provided with two bearing sections, one of which is angularly displaced slightly relative to the other, rods connecting the pistons of the cylinder structures to said bearing sections, the angular displacement of the one bearing section over the other being such as to give the pistons controlling the exhaust ports leads over those controlling the scavenging ports, a fuel injector for each cylinder structure, pump means for supplying fuel to each injector, a scavenging pump located between the cylinder structures and operated from the crank shaft, operating rods for the fuel injectors which extend along the sides of the cylinders and terminate at points directly adjacent the crank shaft, and means on the shaft which engage the operating rods to actuate the fuel valves.

30. In an internal combustion engine, the combination of a cylinder structure comprising two cylinders arranged side by side and having a common combustion chamber, pistons in the cylinders, a shaft having a crank provided with two bearing sections, rods connecting the pistons thereto, a reciprocating air pump comprising a cylinder and piston for supplying air for the engine, a rod connecting the pump piston to the crank between said bearing sections, a fuel injector for the cylinder structure, an operating rod for it which terminates at a point adjacent the shaft, and a cam on the shaft which engages the operating rod to actuate the injector.

31. In an internal combustion engine, the combination of a cylinder, a piston therein, a shaft having a crank, a rod connecting the piston to the crank, a reciprocating air pump having a cylinder and piston, a rod connecting the pump piston to said crank to which the first named piston is connected, a valve for the air pump, an eccentric on the shaft to one side of the crank for operating the air pump valve, a fuel valve for the engine cylinder, an operating rod for it which terminates at a point adjacent the shaft, and a cam on the shaft at the other side of the crank which engages said operating rod to actuate the injector.

In witness whereof, I have hereunto set my hand this 31st day of July, 1916.

WILLIAM EVERETT VER PLANCK.